(12) United States Patent
Ha

(10) Patent No.: US 12,326,815 B2
(45) Date of Patent: Jun. 10, 2025

(54) SWITCHING CONTROLLER, STORAGE DEVICE AND COMPUTING SYSTEM FOR IMPROVING DIFFERENCE OF ACCESS LATENCY BETWEEN MEMORIES

(71) Applicant: SK hynix Inc., Icheon-si (KR)

(72) Inventor: Min Ho Ha, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 81 days.

(21) Appl. No.: 18/315,718

(22) Filed: May 11, 2023

(65) Prior Publication Data

US 2024/0202129 A1    Jun. 20, 2024

(30) Foreign Application Priority Data

Dec. 19, 2022    (KR) .................. 10-2022-0178405

(51) Int. Cl.
*G06F 12/00*     (2006.01)
*G06F 12/0888*   (2016.01)
*G06F 12/0891*   (2016.01)

(52) U.S. Cl.
CPC ...... *G06F 12/0888* (2013.01); *G06F 12/0891* (2013.01); *G06F 2212/1024* (2013.01)

(58) Field of Classification Search
CPC ............. G06F 12/0888; G06F 12/0891; G06F 12/0238; G06F 12/0806; G06F 12/0844; G06F 12/0862; G06F 12/0866; G06F 2212/1024; G06F 13/1605; G06F 13/1668; G06F 13/404; G06F 3/0685
See application file for complete search history.

(56) References Cited

U.S. PATENT DOCUMENTS

| | | | |
|---|---|---|---|
| 8,549,231 B2 | 10/2013 | Sugumar et al. | |
| 9,122,613 B2 | 9/2015 | Lacourba et al. | |
| 9,971,693 B2 | 5/2018 | Svendsen | |
| 2011/0173396 A1 | 7/2011 | Sugumar et al. | |
| 2014/0258622 A1 | 9/2014 | Lacourba et al. | |
| 2016/0335186 A1 | 11/2016 | Svendsen | |
| 2020/0201768 A1* | 6/2020 | Odhiambo | G06F 16/172 |
| 2021/0318961 A1 | 10/2021 | Peterson et al. | |
| 2023/0062773 A1* | 3/2023 | Kaneko | G06F 3/0659 |
| 2023/0222067 A1* | 7/2023 | Ji | G06F 12/0891 |
| | | | 711/136 |

* cited by examiner

*Primary Examiner* — Shawn X Gu

(57) ABSTRACT

A switching controller controlling communication between a processor included in an external device and a memory included in a storage device may pre-fetch memory data into a buffer memory inside the switching controller and provides the data to the processor of the external device based on a command input for a predetermined period.

20 Claims, 11 Drawing Sheets

SWITCHING CONTROLLER, STORAGE DEVICE AND COMPUTING SYSTEM FOR IMPROVING DIFFERENCE OF ACCESS LATENCY BETWEEN MEMORIES

CROSS-REFERENCE TO RELATED APPLICATION

The present application claims priority under 35 U.S.C. § 119(a) to Korean patent application number 10-2022-0178405 filed in the Korean Intellectual Property Office on Dec. 19, 2022, which is incorporated herein by reference in its entirety.

TECHNICAL FIELD

The embodiments of the present disclosure relate to a switching controller, storage devices and a computing system for improving the difference in the access latency between memories.

BACKGROUND

A computing system may include a processor for processing data and a memory for storing data during data processing. Depending on the performance of the computing system, the number of processors included in the computing system and the capacity of memory may increase. In addition, locations of memory included for data processing in a computing system may vary.

For example, part of a memory may be located inside a device including a processor. Such memory may be located close to the processor and may be used for data processing of the processor.

In addition, the processor in a device may perform data processing by additionally utilizing a memory located outside the device to improve data processing performance. This may lead to differences in access latency or access delays between memories used by the processor, and the performance of the computing system may be degraded due to the difference in access latency.

SUMMARY

Embodiments of the disclosure may provide a configuration capable of reducing the difference in access latency between a memory located in a device including a processor and a memory located outside the device, thereby improving data processing performance by the processor.

In one aspect, embodiments of the disclosure may provide a storage device including a plurality of memories, and a switching controller configured to communicate with each of the plurality of memories and to transmit a command input by a plurality of external devices to at least one of the plurality of memories, each of the plurality of memories including a plurality of storage blocks.

The switching controller may include a buffer memory corresponding to at least one of the plurality of external devices, and a buffer memory control module configured to select data stored in at least one of the plurality of storage blocks and to store the selected data in the buffer memory, or to delete data stored in the buffer memory, based on the command input for a predetermined period.

In another aspect, embodiments of the disclosure may provide a switching controller including at least one buffer memory, a buffer memory control module configured to select data stored in at least one of the plurality of storage blocks included in each of a plurality of memories and to store the selected data into the at least one buffer memory, or delete data stored in the at least one buffer memory, based on a command input for a predetermined period by a plurality of external devices, and a routing module configured to transmit the command input by the plurality of external devices to the plurality of memories or the buffer memory.

In another aspect, embodiments of the disclosure may provide a computing system including a plurality of external devices and a storage device.

The storage device may include a plurality of memories, and a switching controller for communicating with the plurality of memories and transmitting a command input by the plurality of external devices to at least one of the plurality of memories and including a buffer memory.

In a computing system, entire data of a storage block included in at least one of the plurality of memories may be stored in the buffer memory based on a command input to the storage device by a first external device of the plurality of external devices, and a part of the entire data stored in the buffer memory is transmitted to a second external device through the switching controller according to a command input to the storage device by the second external device.

According to embodiments of the present disclosure, it is possible to reduce differences in access latency between a memory located in a device including a processor and a memory located outside the device and to improve data processing performance by the processor.

DETAILED DESCRIPTION

Figure 1:
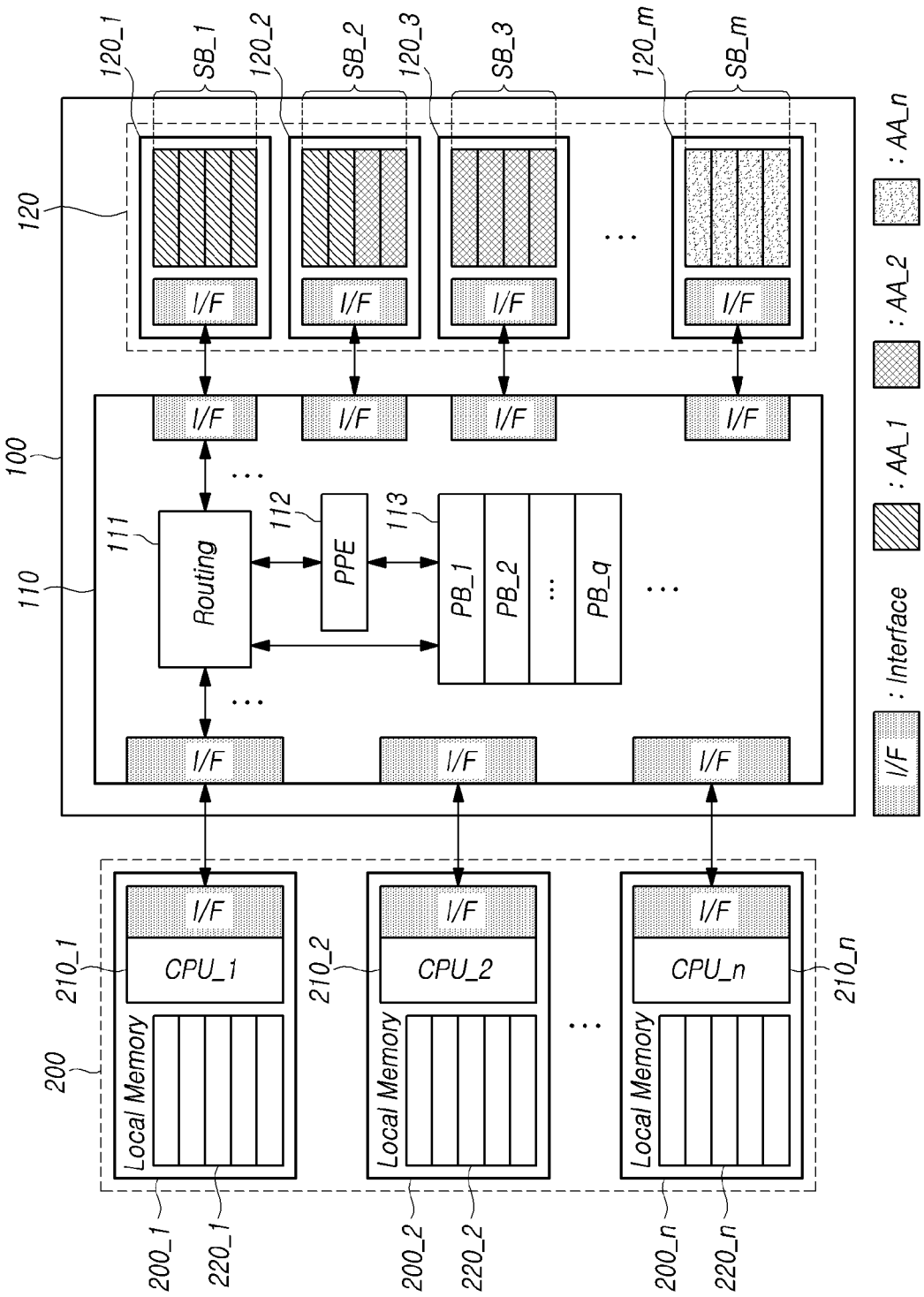
FIG. 1 is a schematic diagram illustrating a configuration of a computing system according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components, even when such components are shown in different drawings. Further, in the following description of examples or embodiments of the present disclosure, detailed descriptions of well-known functions and components incorporated herein will be omitted when it is determined that the description may make the subject matter in some embodiments of the present disclosure unclear. Terms such as "including", "having", "containing", "constituting" "made up of", and "formed of" used herein are generally intended to allow other components to be added unless the terms are used with the term "only" or other similar terms. As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define an order, sequence, or number of elements etc., but is used merely to distinguish the corresponding element from other elements.

When the disclosure provides that a first element "is connected or coupled to", "contacts or overlaps" etc. a second element, it should be interpreted that not only can the first element "be directly connected or coupled to" or "directly contact or overlap" the second element, but in addition a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like are used to describe processes or operations of elements or configurations, or flows or steps in operations, processing, and manufacturing methods, these terms may be used to describe non-consecutive or non-sequential processes or operations unless the term "directly" or "immediately" is also used.

In addition, when any dimensions, relative sizes etc. are disclosed, it should be understood that numerical values for an elements or features, or corresponding information (e.g., level, range, etc.), include a tolerance or error margin that may be caused by various factors (e.g., process factors, internal or external impact, noise, etc.) even when a relevant description is not specified. Further, the term "may" fully encompass all the meanings of the term "can".

Hereinafter, various embodiments of the present disclosure will be described in detail with reference to accompanying drawings.

FIG. 1 is a schematic diagram illustrating a configuration of a computing system according to embodiments of the present disclosure.

Referring to FIG. 1, a computing system may include, for example, a storage device 100 and at least one external device 200. In some embodiments, a plurality of external devices 200 may be used, and may mean a host device, a host server, and the like.

The storage device 100 may include, for example, a switching controller 110 and a plurality of memories 120. The storage device 100 may be referred to as a memory group or a pooled memory server.

The switching controller 110 may communicate with the plurality of memories 120 through a predetermined interface. The switching controller 110 may communicate with the plurality of memories 120 through, for example, a compute express link (CXL) interface, but interfaces are not limited thereto. Since the switching controller 110 communicates with the plurality of memories 120 through the CXL interface, there may be implemented a low-latency, high-bandwidth access environment in a structure for communicating with the plurality of high-capacity memories 120.

The switching controller 110 may communicate with an external device 200 through a predetermined interface. An interface used by the switching controller 110 to communicate with an external device 200 may be the same as or different from an interface used to communicate with the plurality of memories 120.

The switching controller 110 may transmit a command, input from an external device 200, to at least one of the plurality of memories 120.

Data according to a command input from an external device 200 through the switching controller 110 may be written to at least one of the plurality of memories 120. Data, which is stored in at least one of the plurality of memories 120 and corresponds to a command input from the external device 200, may be transmitted to the external device 200 through the switching controller 110. The plurality of memories 120 may be, for example, volatile memories. Alternatively, in some cases, the plurality of memories 120 may be non-volatile memories.

Each of the plurality of memories 120 may include a plurality of storage blocks SB_1, SB_2, SB_3, . . . , SB_m. Each of the plurality of storage blocks SB may be allocated, for example, to the external device 200.

Embodiments may include more than one external device 200. Each of a plurality of external devices 200 may include, for example, a processor 210 and a local memory 220. The local memory 220 may be a memory located adjacent to the processor 210 and used for data processing of the processor 210.

The example shown in FIG. 1 illustrates a computing system including an n number of external devices 200_1, 200_2, . . . , 200_n. Each of the n number of external devices 200_1, 200_2, . . . , 200_n may include a processor 210_1, 210_2, . . . , 210_n, respectively, and a local memory 220_1, 220_2, . . . , 220_n, respectively. Each of the n processors 210_1, 210_2, . . . , 210_n may use the local memory 220_1, 220_2, . . . , 220_n, respectively included in each external device 200, for data processing.

In addition, the processors 210_1, 210_2, . . . , 210_n may utilize an allocated storage block SB among the storage blocks SB of the plurality of memories 120 included in the storage device 100 for data processing. FIG. 1 exemplarily illustrates a storage device 100 including an m number of memories 120 ("m memories 120"). The storage block SB included in each of the m memories 120 may be allocated to one external device 200 or may be allocated to two or more external devices 200.

For example, all of a first storage block SB_1 included in a first memory 120_1 may be a first allocation area AA_1 allocated to a first external device 200_1. A part of a second storage block SB_2 included in a second memory 120_2 may be part of the first allocation area AA_1 allocated to the first external device 200_1. Another part of the second storage block SB_2 included in the second memory 120_2 may be part of a second allocation area AA_2 allocated to the second external device 200_2.

The first processor 210_1 included in the first external device 200_1 may be allocated the entire first storage block SB_1 included in the first memory 120_1 as the first allocation area AA_1 for data processing. In addition, the first processor 210_1 may be allocated a part of the second storage block SB_2 included in the second memory 120_2, which is included in the first allocation area AA_1 for data processing.

The second processor 210_2 included in the second external device 200_2 may be allocated to a part of the second storage block SB_2 included in the second memory 120_2 and to the entire third storage block SB_3 as the second allocation area AA_2 for data processing.

Since the external device 200 may be allocated and use the memory 120 included in the storage device 100 in addition to the local memory 220 included in the external device 200, it is possible to improve data processing performance of the processor 210 included in the external device 200.

In addition, in order to improve the performance of the processor 210 for data processing by using the memory 120 included in the storage device 100, a part of the data stored in the memory 120 may be prefetched by the switching controller 110 and provided to the external device 200.

For example, the switching controller 110 may include a routing module 111, a buffer memory control module 112, and a buffer memory 113.

The routing module 111 may receive a command from the external device 200 through an interface. The routing module 111 may communicate with the plurality of memories 120 through an interface and transmit a command input by the external device 200 to at least one of the plurality of memories 120. The routing module 111 may transmit data corresponding to a command of the external device 200.

The buffer memory control module 112 may check commands or data transmitted and received by the routing module 111 and determine data or a storage block SB to be prefetched in the buffer memory 113. The buffer memory control module 112 may be referred to as a prefetch policy decision engine (PPE).

The buffer memory 113 may be referred to as a prefetch buffer and may include a plurality of buffer blocks PB_1, PB_2, ..., PB_q. A buffer block PB of the buffer memory 113 may store the same data as the data of a storage block SB of the memory 120. Embodiments may include one or more buffer memory 113, and each buffer memory 113 may correspond to an external device 200 as an example.

The buffer memory control module 112 may, for example, store part of data stored in the memory 120 into the buffer memory 113 based on a command input from the external device 200 for a predetermined period. The buffer memory control module 112 may update data stored in the buffer memory 113 while the computing system is operating, and may delete data stored in the buffer memory 113 as necessary.

The buffer memory control module 112 may, for example, determine a storage block SB to be prefetched based on an access frequency to each of the plurality of memories 120 according to a command input from the external device 200 for a preset period. The buffer memory control module 112 may determine a storage block SB to be prefetched based on an access frequency for each of the storage blocks SB according to a command input from the external device 200 for a preset period.

The buffer memory control module 112 may prefetch all or part of a storage block SB included in the memory 120 with high access frequency to the buffer memory 113. The access frequency to the memory 120 may mean a sum of an access frequency to all storage blocks SB included in the memory 120. Alternatively, the buffer memory control module 112 may prefetch the storage block SB with high access frequency into the buffer memory 113. The access frequency to the storage block SB may mean an access frequency to each of the storage blocks SB included the memory 120.

Alternatively, the buffer memory control module 112 may prefetch a storage block SB having an access frequency of a predetermined level or more, from among the storage blocks SB included in the memory 120 with a high access frequency to the buffer memory 113.

As another example, the buffer memory control module 112 may determine which storage block SB to prefetch based on a read request frequency for the plurality of memories 120 or for the storage block SB according to a command input from the external device 200 during a preset period.

The buffer memory control module 112 may prefetch a storage block SB having a high read request frequency to the buffer memory 113 for a preset period.

Alternatively, the buffer memory control module 112 may select a storage block SB having a read request frequency equal to or higher than a predetermined level, from among storage blocks SB included in the memory 120 having a high read request frequency during a preset period. The buffer memory control module 112 may prefetch the selected storage block SB to the buffer memory 113.

As another example, the buffer memory control module 112 may select, as a storage block SB to be prefetched, at least a part of a storage block SB adjacent to a storage block SB having a high access frequency or a high read request frequency during a preset period. Since data stored in a storage block SB adjacent to a storage block SB having a high access frequency or a high read request frequency is also likely to be requested by the external device 200, the corresponding storage block SB may be prefetched into the buffer memory 113.

In addition to the above example, the buffer memory control module 112 may prefetch the storage block SB, which is expected to have a high possibility of access or read request, into the buffer memory 113 according to the command of the external device 200.

In addition, in some cases, the buffer memory control module 112 may variably set a reference for determining the storage block SB to be prefetched according to the remaining capacity of the buffer memory 113.

For example, the buffer memory control module 112 may set a reference value, which is compared with the access frequency or the read request frequency, to a low value if there is availability in the buffer block PB included in the buffer memory 113. If the availability of the buffer block PB included in the buffer memory 113 is insufficient, then the reference value may be changed to a higher value.

If there is no empty buffer block PB in the buffer memory 113 when a storage block SB to be prefetched in the buffer memory 113 is generated, then the buffer memory control module 112 may determine whether to delete data stored in the existing buffer block PB.

The buffer memory control module 112 may delete data of a buffer block PB having an access frequency or read request frequency smaller than the access frequency or read request frequency of the storage block SB to be prefetched. When there is no buffer block PB having an access frequency or read request frequency smaller than smaller than the access frequency or the read request frequency of the storage block SB to be prefetched, the buffer memory control module 112 may stop prefetching of the additionally selected storage block SB.

When an access frequency or a read request frequency of the buffer block PB is equal to or within a certain range of the access frequency or read request frequency of the storage block SB to be prefetched, the buffer memory control module 112 may check the time elapsed from the latest access to the buffer block PB.

The buffer memory control module 112 may delete the data of the buffer block PB for which the elapsed time from the latest access time is equal to or greater than a threshold value, and may prefetch data of the newly selected storage block SB into the corresponding buffer block PB.

According to embodiments of the present disclosure, the switching controller 110 performing communication between the external device 200 and the plurality of memories 120 may prefetch a part of the storage block SB included in the memories 120 into the buffer memory 113 included in the switching controller 110, so that the external device 200 may access data stored in the memory 120 included in the storage device 100 at a reduced access speed. The performance of data processing by the processor 210 may be improved by reducing the difference between the access speed of the processor 210 in the external device 200 to the local memory 220 and the access speed of the processor 210 in the external device 200 to the storage device 100.

The buffer memory control module 112 may prefetch data of the storage block SB of the memory 120 into the buffer block PB of the buffer memory 113 independently of the operation of the external device 200 or the routing module 111. The buffer memory control module 112 and the buffer memory 113 in the switching controller 110 may be implemented in various ways.

Figure 2:
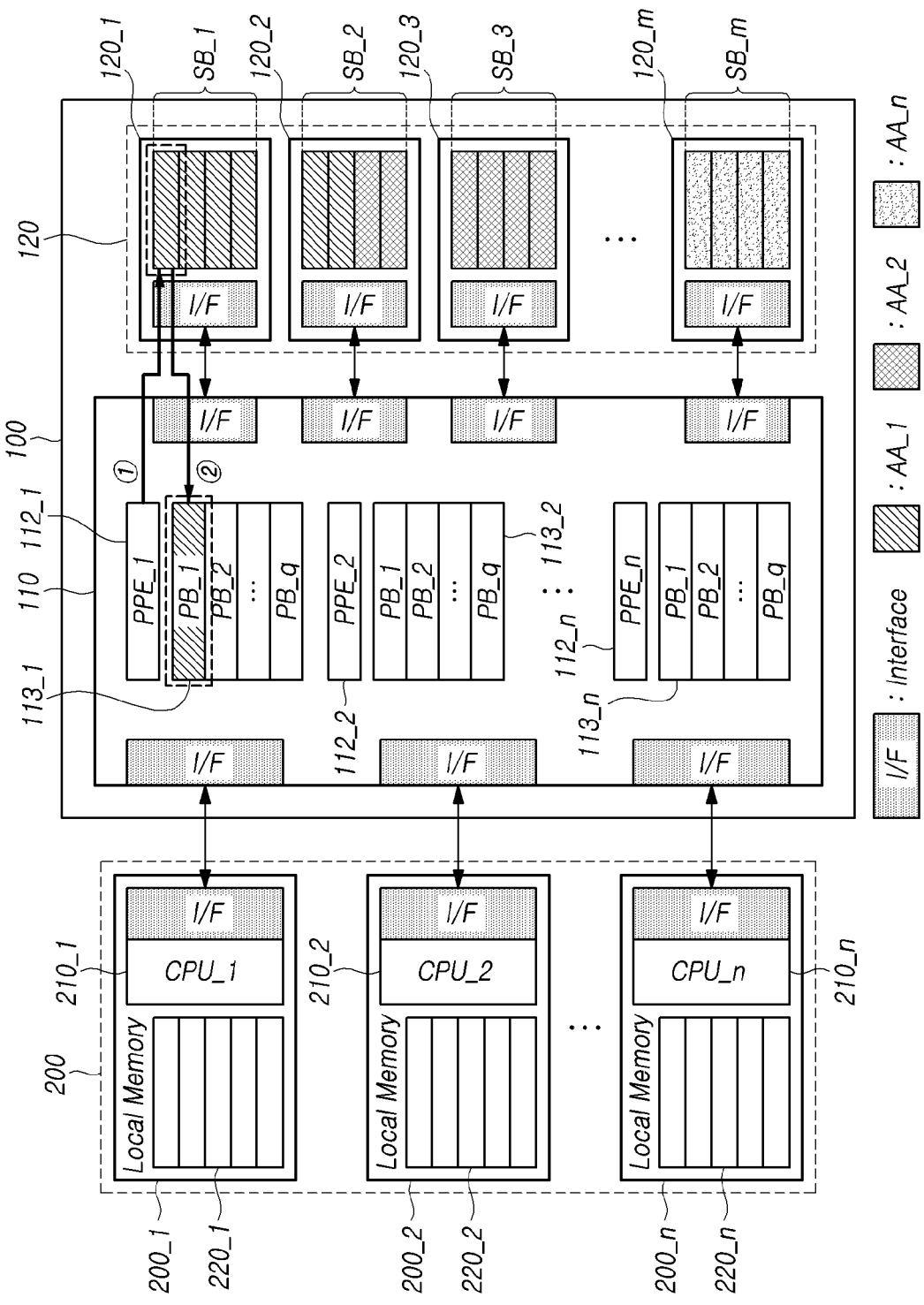
FIGS. 2 and 3 illustrate an example of a structure and an example of an operation method of a switching controller included in a computing system according to embodiments of the present disclosure.
Figure 3:
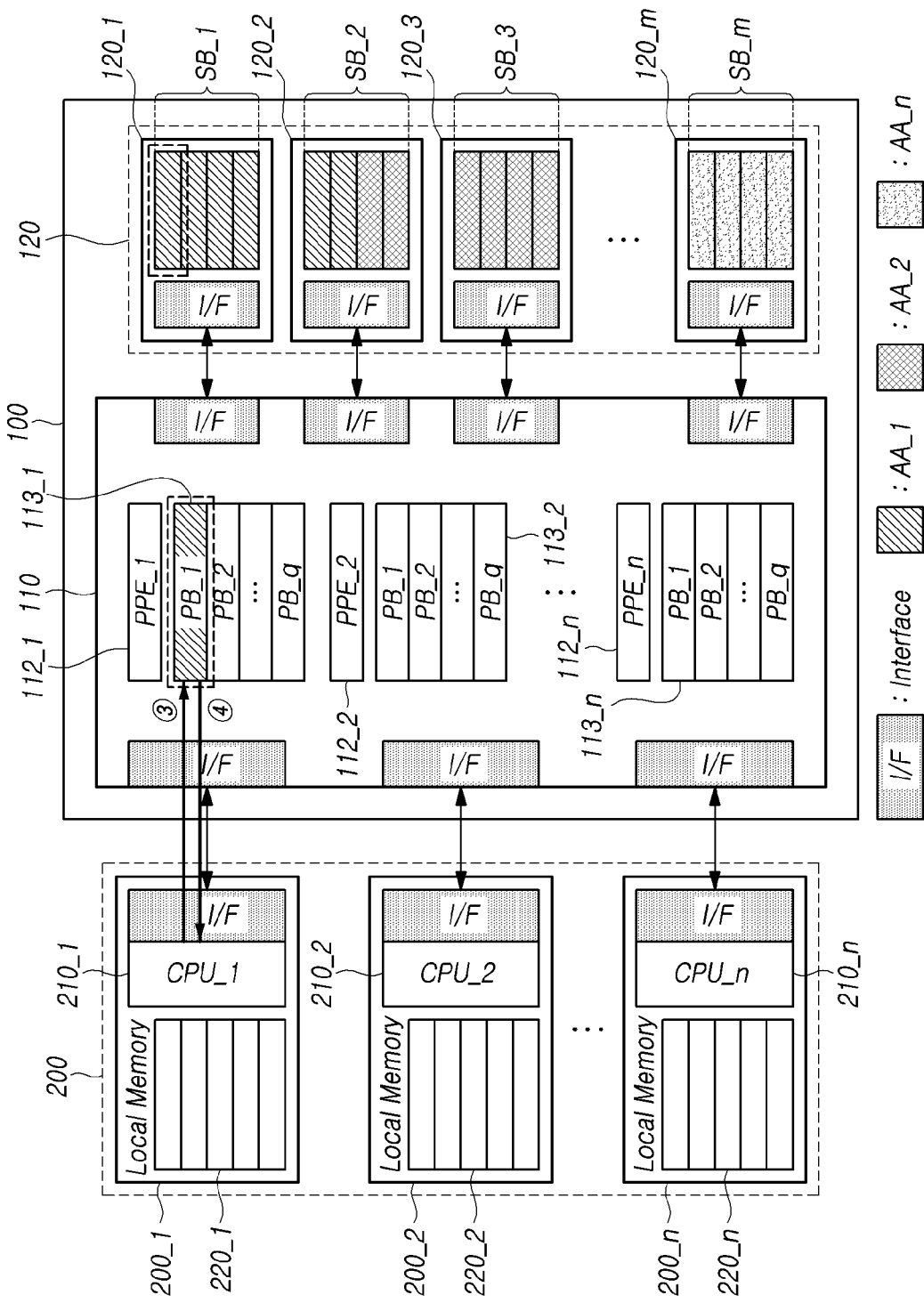

FIGS. 2 and 3 illustrate an example of a structure and an example of an operation method of a switching controller included in a computing system according to embodiments of the present disclosure.

Referring to FIGS. 2 and 3, a switching controller 110 may include a buffer memory 113 corresponding to at least one external device 200. For example, the switching controller 110 may include n buffer memories 113_1, 113_2, . . . , 113_n corresponding to the n external devices 200_1, 200_2, . . . , 200_n, respectively.

The switching controller 110 may include n buffer memory control modules 112_1, 112_2, . . . , 112_n for respectively controlling each of the n buffer memories 113_1, 113_2, . . . , 113_n. In some cases, however, one buffer memory control module 112 may control two or more buffer memories 113.

The switching controller 110 may include a routing module 111 communicating with n buffer memory control modules 112_1, 112_2, . . . , 112_n. Although FIGS. 2 and 3 do not illustrate a routing module 111 for convenience in explanation, the routing module 111 may transmit a command input by the external device 200 to the memory 120 or transmit data of the memory 120 to the external device 200, as described above with reference to FIG. 1.

In addition, the routing module 111 may transmit a command input by the external device 200 to at least one of the n buffer memories 113_1, 113_2, . . . , 113_n. The data transmission may be performed after checking whether the data of the storage block SB has been prefetched to the n buffer memories 113_1, 113_2, . . . , 113_n.

Each of the n buffer memory control modules 112_1, 112_2, . . . , 112_n may identify or check a command of the external device 200 through the routing module 111, and may prefetch a storage block SB of the memory 120 into the buffer memory 113.

For example, referring to FIG. 2, a first buffer memory control module 112_1 may determine whether to prefetch a storage block SB of the memory 120 into a first buffer memory 113_1 based on a command input by the external device 200 for a preset period.

The reference for determining whether the storage block SB is to be prefetched by the first buffer memory control module 112_1 may be similar to examples described above with reference to FIG. 1.

For example, the first buffer memory control module 112_1 may determine which storage block SB to be prefetched based on an access frequency and a read request frequency for the memory 120 or the storage block SB, or an adjacency to the prefetched storage block SB whose data is already prefetched in the first buffer memory 113_1. If the storage block SB is adjacent to the prefetched storage block SB, a possibility that a data stored in the adjacent storage block SB may be high. Thus, in some cases, the data stored in the storage block SB adjacent to the prefetched storage block SB may be prefetched in the first buffer memory 113_1.

Referring to FIG. 2, as shown in ①, the first buffer memory control module 112_1 may select one of the first storage blocks SB_1 included in the first memory 120_1 and allocated to a first external device 200_1 as the storage block SB to be prefetched. The first buffer memory control module 112_1 may request a prefetch to the first storage block SB_1 of the first memory 120_1.

As shown in ②, the data of the first storage block SB_1 selected as a prefetch block in response to the request of the first buffer memory control module 112_1 may be prefetched to one of the buffer blocks PB of the first buffer memory 113_1.

Similarly, each of the remaining buffer memory control modules 112_2, . . . , and 112_n may determine a storage block SB to be prefetched according to respective commands of an external device 200_2, . . . , to and an n-th external device 200_n. Each of the buffer memory control modules 112_2, . . . , and 112_n may, when the storage block SB to be prefetched is determined, prefetch data stored in the corresponding storage block SB to the buffer memories 113_2, . . . , and 113_n.

Accordingly, each buffer memory control module 112 may determine a storage block SB to be prefetched into each buffer memory 113 based on a command of the external device 200 transmitted through the routing module 111. Each buffer memory control module 112 may store the data of the determined storage block SB in the buffer memory 113, may determine whether to retain or delete the prefetched storage block SB and may manage the prefetched storage block SB.

The routing module 111 may provide data stored in the buffer memory 113 by the buffer memory control module 112 to the external device 200 in response to a command input by the external device 200.

Referring to FIG. 3, as an example, a read request command may be input by a first external device 200_1. A command input by the first external device 200_1 may be transmitted to at least one of the plurality of buffer memories 113_1, 113_2, . . . , 113_n through the routing module 111.

For example, if a command is input by the first external device 200_1, the routing module 111 may transmit a corresponding command to the first buffer memory 113_1 that manages the prefetching of the storage block SB allocated to the first external device 200_1.

As shown in ③, a command by the first external device 200_1 may be transmitted to the first buffer memory 113_1. When data requested by the first external device 200_1 has been prefetched to the first buffer memory 113_1, the corresponding data may be transmitted to the first external device 200_1 as shown in ④. For example, corresponding data stored in the first buffer memory 113_1 may be transmitted to the first external device 200_1 through the routing module 111.

The first buffer memory control module 112_1 may update the access frequency or the read request frequency, which are prefetch management references for the prefetched storage block SB, after transmitting the prefetched data.

If the data requested by the first external device 200_1 is not prefetched to the first buffer memory 113_1, then the routing module 111 may transmit the command input by the first external device 200_1 to the memory 120 storing data corresponding to the command, and may transmit data stored in the corresponding memory 120 to the first external device 200_1.

Accordingly, the buffer memory control module 112 prefetches the data stored in the memory 120 to the buffer memory 113 based on the command of the external device 200, thereby improving the transmission speed of data requested by the external device 200. In addition, since the buffer memory control module 112 corresponding to each external device 200 operates independently, it is possible to improve both prefetch performance and data processing speed in response to a request from each external device 200.

Alternatively, the buffer memory 113 included in the switching controller 110 may correspond to a plurality of external devices 200. The buffer memory control module 112 may determine a storage block SB to be prefetched to the buffer memory 113 based on a command input by the plurality of external devices 200.

Figure 4:
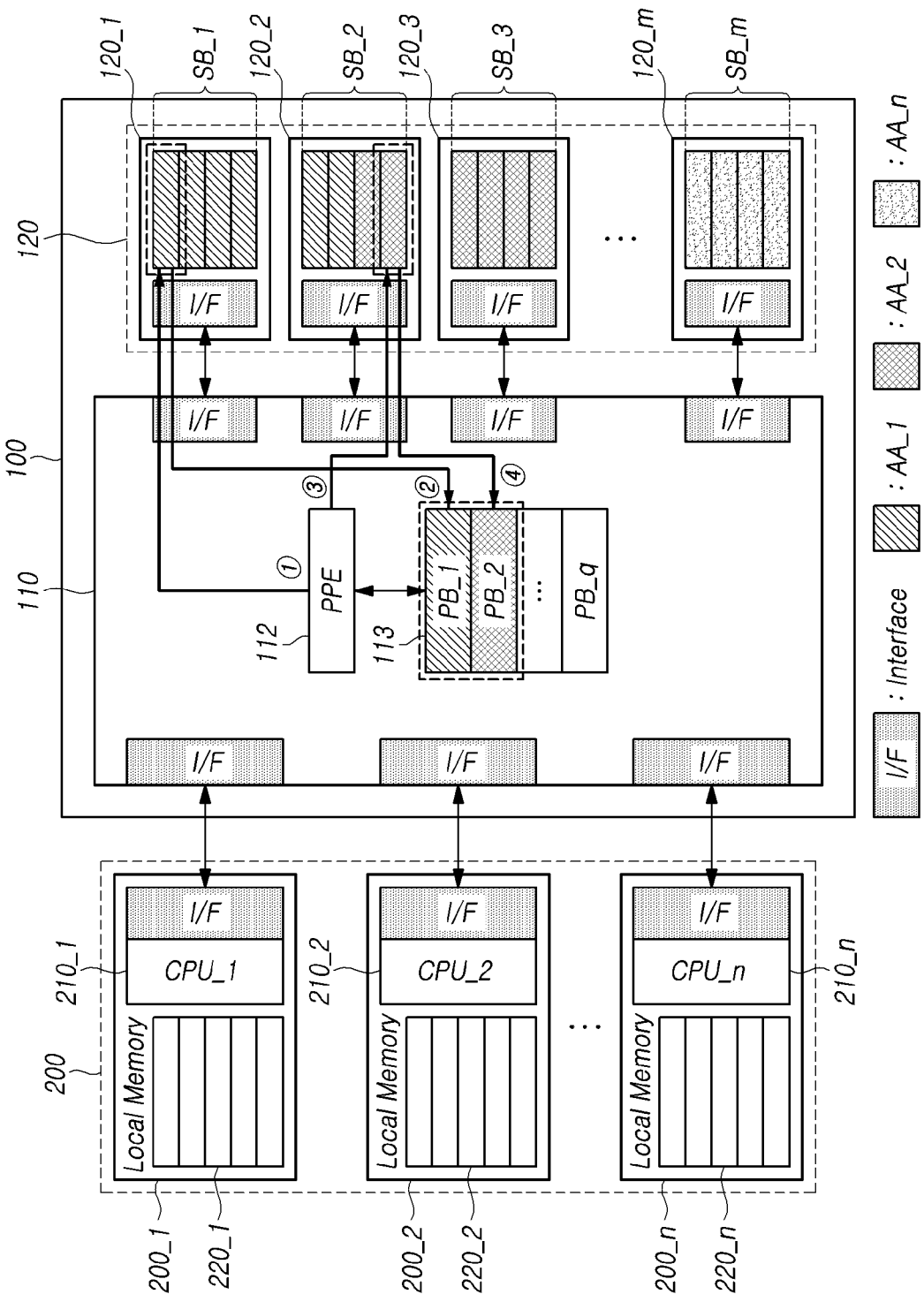
FIGS. 4 and 5 illustrate another example of a structure and an operation method of a switching controller included in a computing system according to embodiments of the present disclosure.
Figure 5:
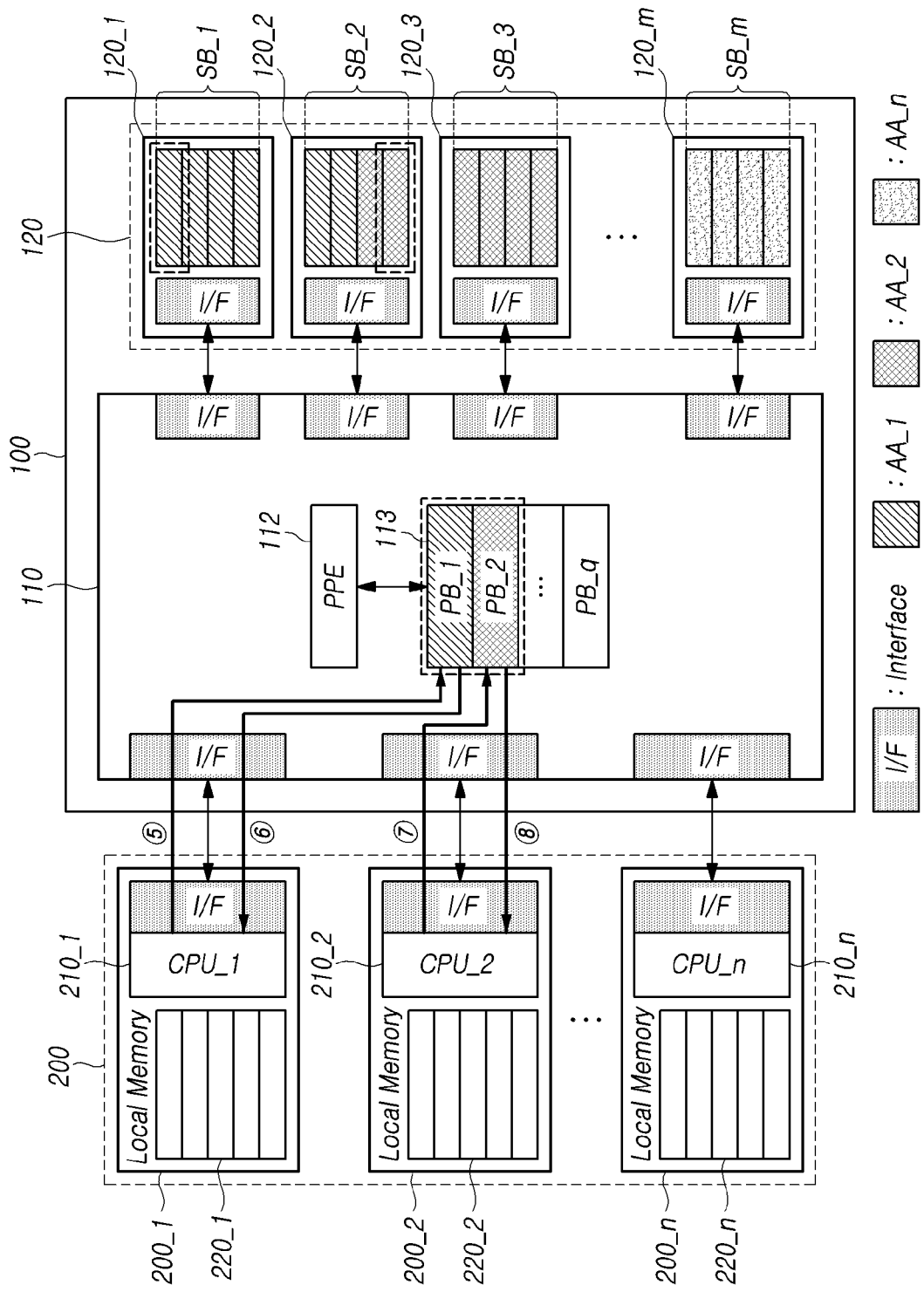

FIGS. 4 and 5 illustrate another example of a structure and an example of an operation method of a switching controller included in a computing system according to embodiments of the present disclosure.

Referring to FIGS. 4 and 5, a switching controller 110 may include a buffer memory 113 corresponding to n external devices 200_1, 200_2, . . . , 200_n. The switching controller 110 may include a buffer memory control module 112 for controlling prefetching of data for the buffer memory 113. The switching controller 110 may include a routing module 111 (not illustrated), which provides a command input by the external device 200 to the buffer memory control module 112. The buffer memory control module 112 may receive a command input from the external device 200 through the routing module 111. The buffer memory control module 112 may store part of data stored in the memory 120 into the buffer memory 113 based on a command input during a preset period.

Referring to FIG. 4, as an example, the buffer memory control module 112 may select a first storage block SB_1 included in the first memory 120_1 and allocated to a first external device 200_1 as a prefetch block, as shown in ①. The buffer memory control module 112 may request prefetching of the first storage block SB_1 of the first memory 120_1.

As illustrated in ②, the first storage block SB_1 may be prefetched into one of the buffer blocks PB of the buffer memory 113. For example, the first storage block SB_1 of the first memory 120_1 may be prefetched to a first buffer block PB_1.

In addition, the buffer memory control module 112 may determine a storage block SB to be prefetched based on a command from another external device 200.

For example, the buffer memory control module 112 may receive a command from a second external device 200_2 through the routing module 111, and may determine whether to prefetch the storage block SB storing data corresponding to the command of the second external device 200_2.

If an access frequency or a read request frequency for the storage block SB storing data corresponding to the command of the second external device 200_2 satisfies the prefetch criterion, then the buffer memory control module 112 may request a prefetch to the second storage block SB_2 included in the second memory 120_2 corresponding to the second external device 200_2, as shown in ③.

As in ④, the second storage block SB_2 of the second memory 120_2 may be prefetched into a buffer block PB of the buffer memory 113. For example, data of the second storage block SB_2 of the second memory 120_2 may be prefetched into the second buffer block PB_2 of the buffer memory 113.

Accordingly, a storage block SB storing data corresponding to a command by two or more external devices 200 may be prefetched into the buffer memory 113 by the buffer memory control module 112. Thereafter, if a read request is issued by each external device 200, the requested data may be already prefetched to the buffer memory 113.

For example, referring to FIG. 5, a read request may be issued by the first external device 200_1. As in ⑤, the read request by the first external device 200_1 may be transferred to the buffer memory 113. The read request by the first external device 200_1 may be transferred to the buffer memory 113 through the routing module 111 (not illustrated).

If data according to the read request of the first external device 200_1 is prefetched in the buffer memory 113, the corresponding data may be transmitted to the first external device 200_1 as in ⑥. The corresponding data may be transmitted to the first external device 200_1 through the routing module 111.

When a read request is issued by a second external device 200_2, the corresponding read request may be transmitted to the buffer memory 113 as in ⑦. As illustrated in ⑧, data corresponding to the issued read request may be transmitted to the second external device 200_2.

When data according to the read request of the first external device 200_1 or the second external device 200_2 is not stored in the buffer memory 113, the routing module 111 may transmit a corresponding command to one of the memories 120 and transmit corresponding data to the external device 200.

Accordingly, by prefetching storage blocks SB included in the memory 120, data is provided to the external device 200 from the buffer memory 113 corresponding to two or more external devices 200. The buffer memory control module 112 controls prefetching to the buffer memory 113.

Alternatively, in some cases, the buffer memory 113 may correspond to two or more external devices 200, and the buffer memory control module 112 for controlling prefetching to the buffer memory 113 corresponds to each external device 200.

Figure 6:
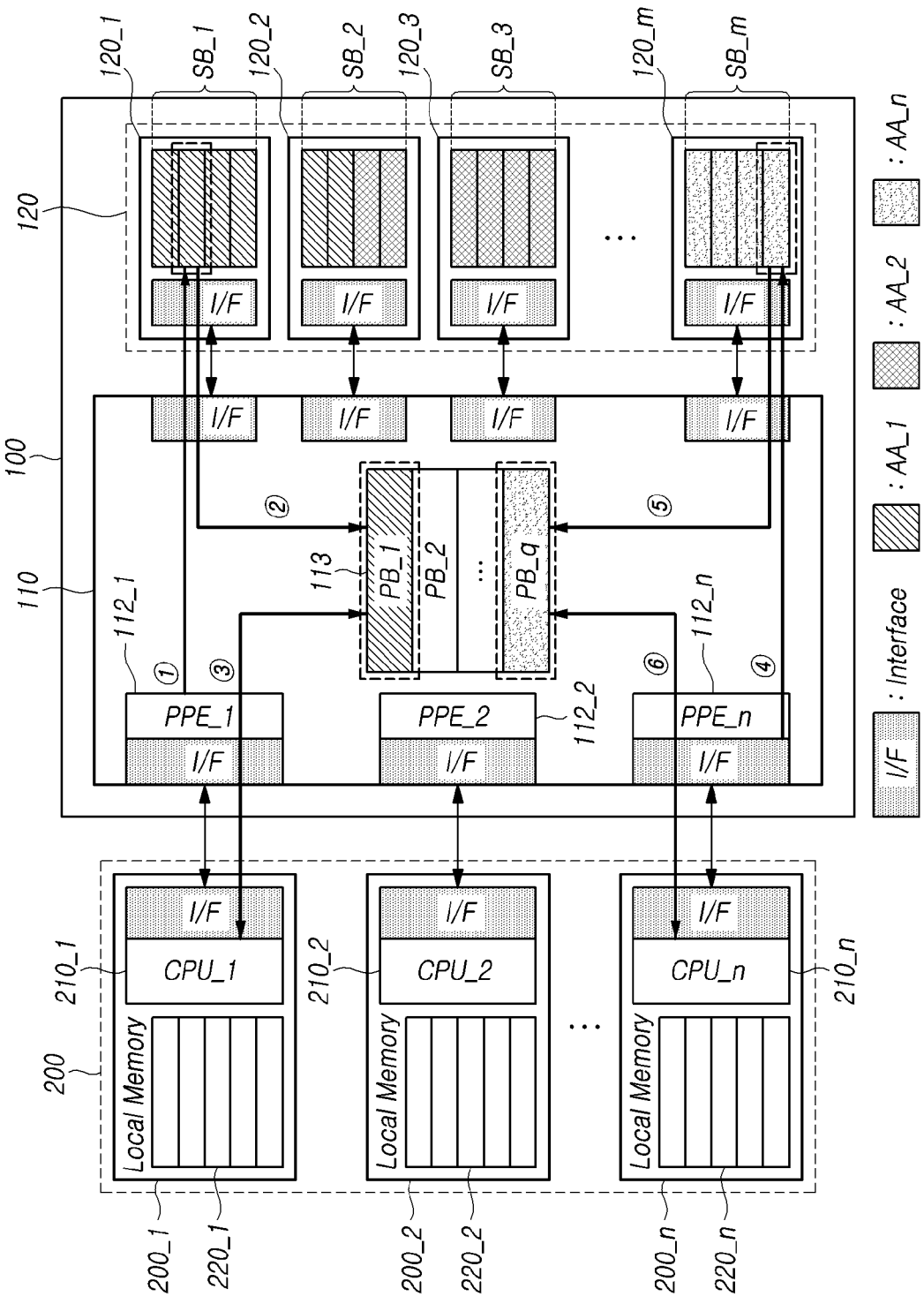
FIG. 6 illustrates another example of a structure of a switching controller and an example of an operation method of a switching controller included in a computing system according to embodiments of the present disclosure and an example of an operation method thereof.

FIG. 6 illustrates another example of a structure of a switching controller and an example of an operation method of a switching controller included in a computing system according to embodiments of the present disclosure and an example of an operation method thereof.

Referring to FIG. 6, a switching controller 110 may include a buffer memory 113 corresponding to a plurality of external devices 200. For example, the example shown in FIG. 6 illustrates a buffer memory 113 that corresponds to n external devices 200_1, 200_2, . . . , 200_n.

Storage blocks SB selected based on commands of n external devices 200_1, 200_2, ..., 200_n may be prefetched into the buffer memory 113.

The switching controller 110 may include two or more buffer memory control modules 112, which control prefetching of the storage block SB into the buffer memory 113.

For example, the switching controller 110 may include n buffer memory control modules 112_1, 112_2, ..., 112_n.

Each of the n buffer memory control modules 112_1, 112_2, ..., 112_n may correspond to each of the n external devices 200_1, 200_2, ..., 200_n. Each of the n buffer memory control modules 112_1, 112_2, ..., 112_n may determine data to be prefetched to the buffer memory 113 based on commands input by each of the n external devices 200_1, 200_2, ..., 200_n, or control the transmission of data to each of n external devices 200_1, 200_2, ..., 200_n, 200_n.

These examples may correspond to a case in which each of the n buffer memory control modules 112_1, 112_2, ..., 112_n performs the function of the routing module 111. Alternatively, in other cases, a separate routing module 111 may be included in the switching controller 110.

For example, a first buffer memory control module 112_1 may determine whether to prefetch the storage block SB allocated to the first external device 200_1 to the buffer memory 113 based on a command input by the first external device 200_1 during the preset period and the prefetch criterion.

If a storage block SB satisfying the prefetch criterion is generated, the first buffer memory control module 112_1 may request a prefetch to the corresponding storage block SB as in ①. According to a request from the first buffer memory control module 112_1, the data of the first storage block SB_1 included in the first memory 120_1 and allocated to the first external device 200_1 may be prefetched into the buffer memory 113, as in ②.

Thereafter, if a read request from the first external device 200_1 is received, the first buffer memory control module 112_1 may check whether data corresponding to the read request has been prefetched to the buffer memory 113.

If the data requested to read by the first external device 200_1 has been prefetched in the buffer memory 113, then the first buffer memory control module 112_1 may transmit corresponding data to the first external device 200_1, as in ③.

If the data requested to read by the first external device 200_1 has not been prefetched in the buffer memory 113, then the first buffer memory control module 112_1 may transmit the corresponding command to the memory 120 and provide data read from the storage block SB of the memory 120 to the first external device 200_1.

Similarly, the n-th buffer memory control module 112_n may determine whether to prefetch the storage block SB allocated to the nth external device 200_n to the buffer memory 113 based on a command input by the n-th external device 200_n during a preset period and the prefetch criterion.

If a storage block SB satisfying the prefetch criterion is generated, then the n-th buffer memory control module 112_n may request a prefetch to the storage block SB as in ④. In response to the request of the n-th buffer memory control module 112_n, the data of a m-th storage block SB_m included in a m-th memory 120_m and allocated to the n-th external device 200_n may be prefetched into the buffer memory 113, as in ⑤.

Subsequently, when a read request by the n-th external device 200_n is received, the n-th buffer memory control module 112_1 may check whether data corresponding to the read request has been prefetched in the buffer memory 113.

If the data read-requested by the n-th external device 200_n has been prefetched in the buffer memory 113, then the n-th buffer memory control module 112_n may transmit data prefetched in the buffer memory 113 to the n-th external device 200_n, as in ⑥.

If the data read-requested by the n-th external device 200_n has not been prefetched in the buffer memory 113, then the n-th buffer memory control module 112_n may transmit the corresponding command to the memory 120 and provide data read from the storage block SB of the memory 120 to the n-th external device 200_n.

Accordingly, prefetch operations may be performed by the buffer memory 113 corresponding to the plurality of external devices 200, with the plurality of buffer memory control modules 112 corresponding to each of the plurality of external devices 200.

When there is insufficient space for prefetching storage blocks SB to the buffer memory 113, each of the n buffer memory control modules 112_1, 112_2, ..., 112_n may delete data prefetched in some buffer blocks PB according to a prefetch criterion. When the deleting data prefetched by another buffer memory control module 112, a buffer memory control module 112 may directly delete the data, or may send a request for deletion of the data to the buffer memory control module 112 with the prefetched data.

Alternatively, each of the buffer memory control modules 112 may periodically delete the data whose access frequency or read request frequency is below a specific level after an elapsed time, as measured from the time when data was last prefetched into the buffer memory 113, thereby efficiently managing the space of the shared buffer memory 113.

In addition, in some cases, each of the storage blocks SB of the memory 120 may be allocated to two or more external devices 200. Data used by other external devices 200 may be simultaneously prefetched to each buffer block PB included in the buffer memory 113.

Figure 7:
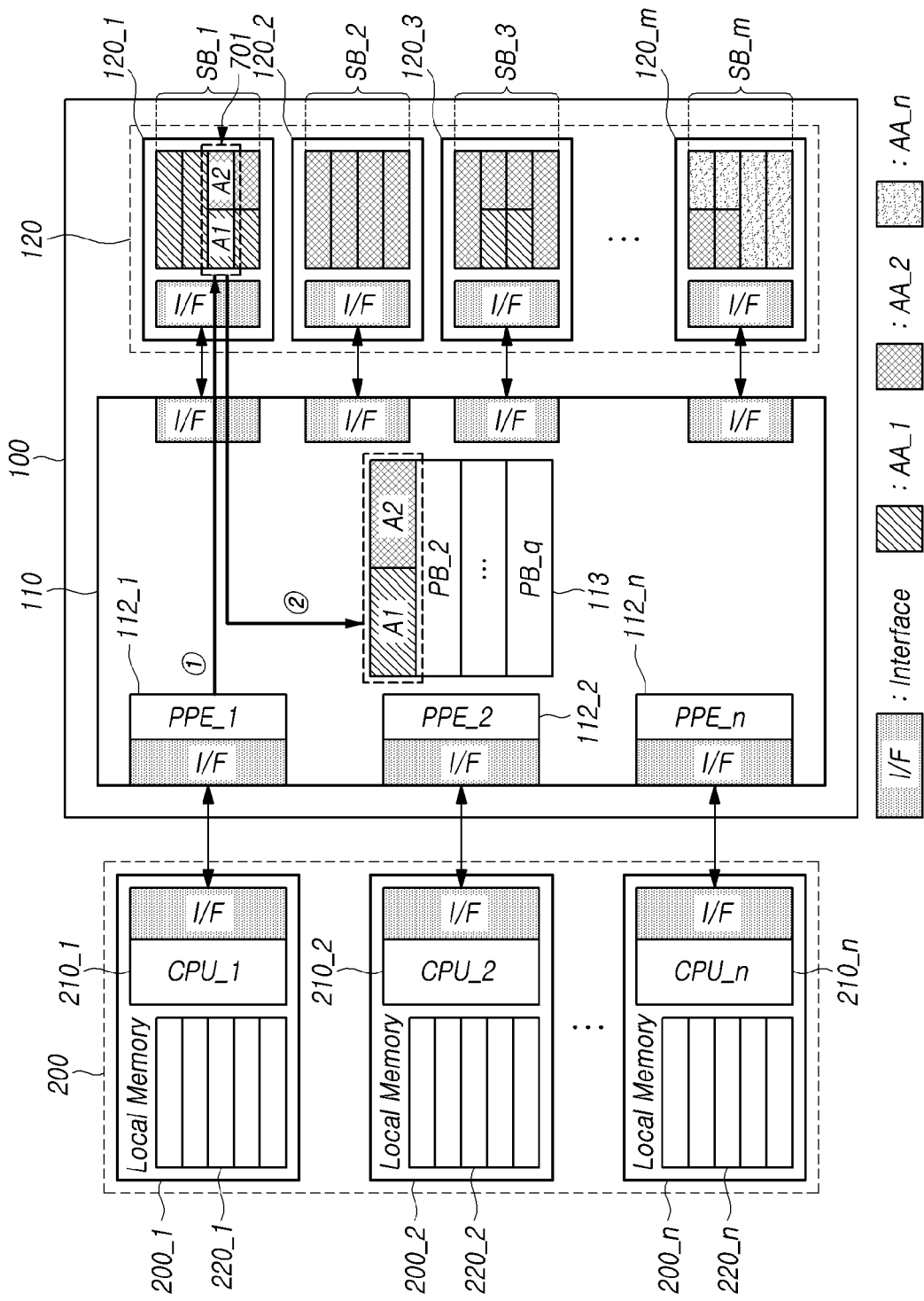
FIGS. 7 to 9 illustrate another example of a structure and an example of an operation method of a switching controller included in a computing system according to embodiments of the present disclosure.
Figure 8:
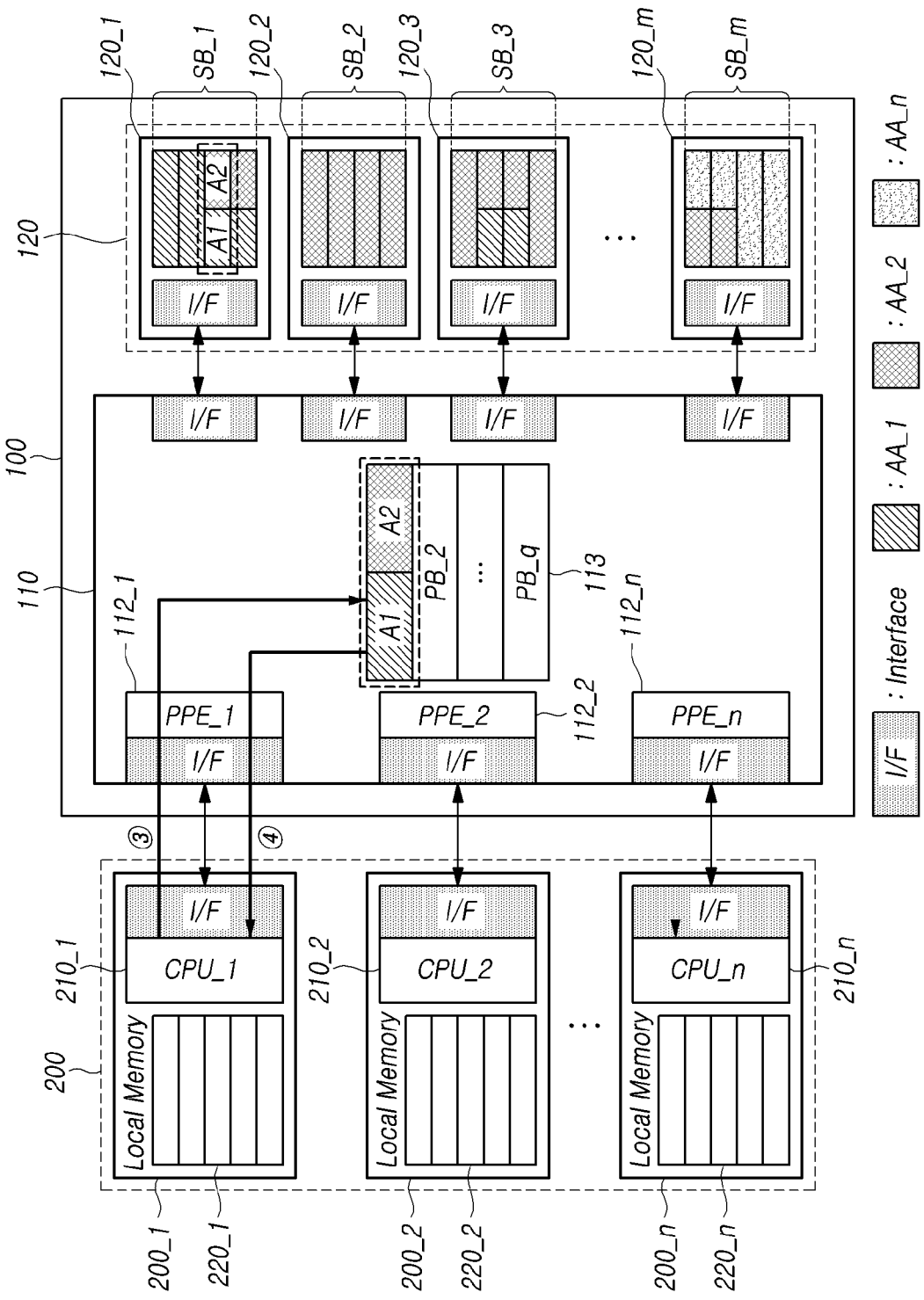
Figure 9:
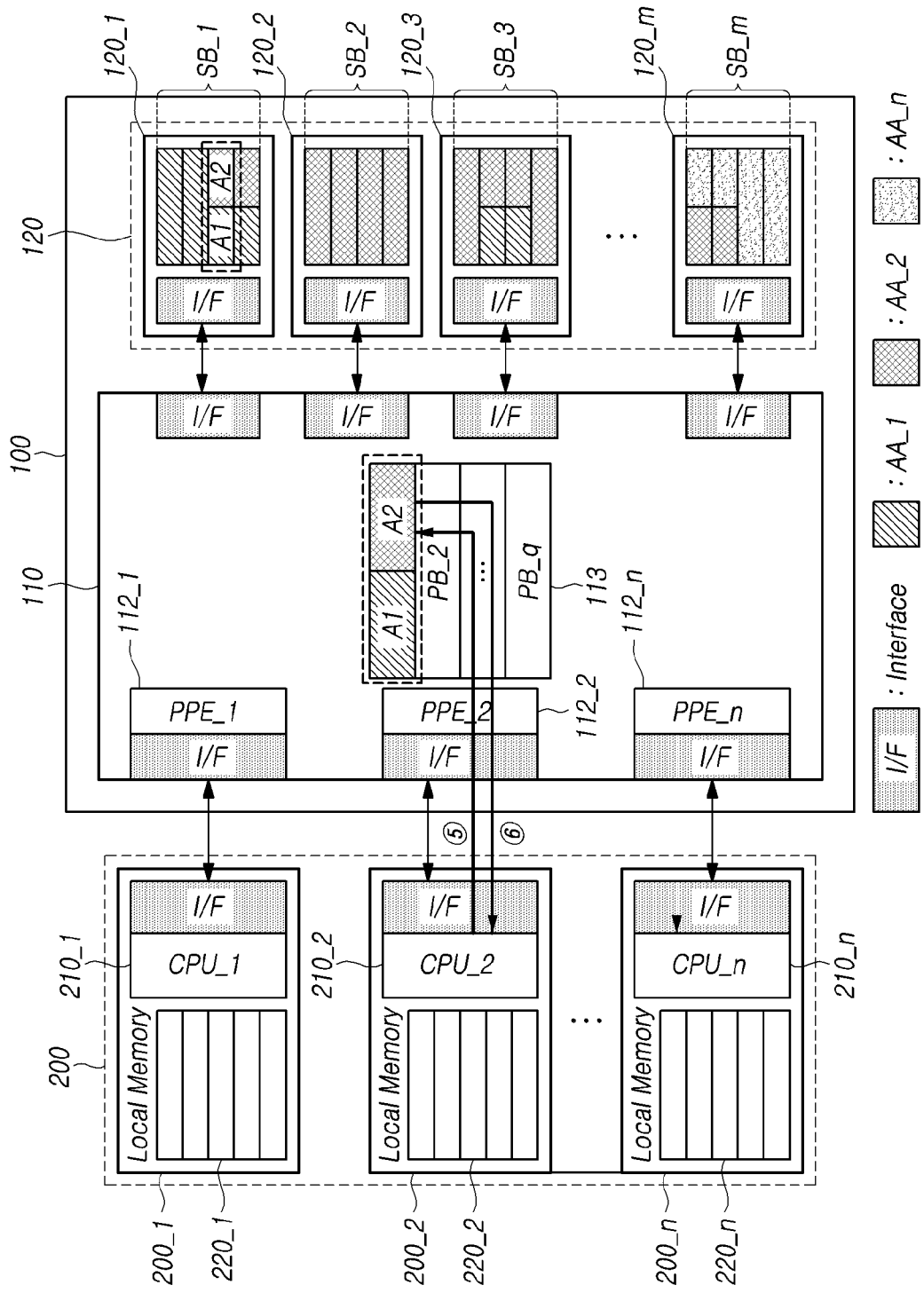

FIGS. 7 to 9 illustrate another example of a structure and an example of an operation method of a switching controller included in a computing system according to embodiments of the present disclosure.

Referring to FIGS. 7 to 9, a switching controller 110 may include a buffer memory 113 corresponding to two or more external devices 200.

The switching controller 110 may include at least one buffer memory control module 112 for controlling prefetching of data into the buffer memory 113. FIGS. 7 to 9 illustrate a switching controller 110 including n buffer memory control modules 112_1, 112_2, ..., 112_n corresponding respectively to n external devices 200_1, 200_2, ..., 200_n. Although not illustrated as an example, in some cases the buffer memory control module 112 may be configured to correspond to at least two or more external devices 200, similar to other examples described above.

The storage blocks SB included in the memory 120 may be allocated to any one external device 200, respectively. Alternatively, in some cases, at least one of the plurality of storage blocks SB may be allocated to two or more external devices 200.

For example, as indicated by 701 shown in FIG. 7, a part of a storage block SB_1 included in a first memory 120_1 may include a first area A1 and a second area A2. The first area A1 may refer to a first allocation area AA1 in the storage block SB allocated to a first external device 200_1. The second area A2 may refer to a second allocation area AA2 in the storage block SB allocated to a second external device 200_2.

The shared first storage block SB_1 may be prefetched based on an access frequency or a read request frequency of to the first area A1 of the first storage block SB_1, and/or based on an access frequency or a read request frequency to the second area A2 of the first storage block SB_1.

For example, criteria for whether to prefetch to the shared first storage block SB_1 may be based on the sum of the access frequency or the read request frequency for the first area A1 and the access frequency or the read request frequency for the second area A2.

Alternatively, criteria for whether to prefetch to the shared first storage block SB_1 may be based on each of the access frequency or the read request frequency for the first area A1 and the access frequency or the read request frequency for the second area A2.

For example, if the access frequency or the read request frequency for first area A1 is equal to or greater than a preset reference value, or if the access frequency or the read request frequency for the second area A2 is greater than or equal to a preset reference value, then the shared first storage block SB_1 may be prefetched into the buffer memory 113.

Referring to an example in FIG. 7, the first buffer memory control module 112_1 may request prefetch for the shared first storage block SB_1 based on the access frequency or the read request frequency for the first area A1 of the shared first storage block SB_1, as in ①.

In response to the request of the first buffer memory control module 112_1, the shared first storage block SB_1 may be prefetched into the buffer memory 113 as shown in ②. The data of the first area A1 and data of the second area A2 of the shared first storage block SB_1 may be prefetched into the buffer memory 113.

Thereafter, when a read request is issued by the first external device 200_1, the first buffer memory control module 112_1 may check whether data, which is a target of a read request, is prefetched into the buffer memory 113.

For example, referring to FIG. 8, if a command is input by the first external device 200_1, then the first buffer memory control module 112_1 may check whether data corresponding to the command is prefetched in the buffer memory 113, as in ③.

If the data of the first area A1 is prefetched and in the buffer memory 113, then the first buffer memory control module 112_1 may transmit corresponding data to the first external device 200_1 as shown in ④.

If the data of the first area A1 is read, then the first buffer memory control module 112_1 may update the access frequency or read request frequency for the storage block SB prefetched to the buffer memory 113.

In addition, even when a command is input by another external device 200, checks may be performed for whether data corresponding to the command has been prefetched to the buffer memory 113.

For example, referring to FIG. 9, a command may be input by a second external device 200_2.

The second buffer memory control module 112_2 may check whether data corresponding to a command from the second external device 200_2 is prefetched into the buffer memory 113.

If data corresponding to a command from the second external device 200_2 is data stored in the second area A2 prefetched in the buffer memory 113, the second buffer memory control module 112_2 may read prefetched data into a buffer block PB of the buffer memory 113, as in ⑤.

The second buffer memory control module 112_2 may transmit the data of the second area A2 prefetched in the buffer memory 113 to the second external device 200_2 as in ⑥.

After the read of the second area A2 prefetched in the buffer memory 113 is performed, the second buffer memory control module 112_2 may update an access frequency or read request frequency for the storage block SB used for prefetching in the buffer memory 113.

When a storage block SB of the memory 120 is a storage block SB shared by two or more external devices 200, the entire data of the shared storage block SB may be prefetched into the buffer memory 113 by any one buffer memory control module 112.

Thereafter, if a read request is issued by the external device 200 corresponding to the buffer memory control module 112 that performed the prefetch, the read request may be rapidly processed by the data prefetched in the buffer memory 113. In addition, when a read request is issued by an external device 200 corresponding to the buffer memory control module 112, which did not perform prefetching, the data stored in the shared area of the prefetched storage block SB may be transmitted to the external device 200. The read request by the external device 200 may be quickly processed by providing data prefetched to the buffer memory 113 without accessing the memory 120 storing the corresponding data.

Therefore, prefetching a shared storage block based on the access frequency or the read request frequency for each area within the storage block SB may be accomplished so that it is possible to simultaneously improve the access speed of the external device 200 associated with prefetching and the access speed of other external devices 200.

In addition, after prefetching a storage block into the buffer memory 113, there may be determined whether to retain data in the buffer memory 113 based on the access frequency or the read request frequency for each shared area, thereby increasing the effect of improving access speed based on prefetching storage blocks.

Data management for prefetch determination by the buffer memory control module 112 and a method for managing prefetched data in the buffer memory 113 may be implemented in various ways.

Figure 10:
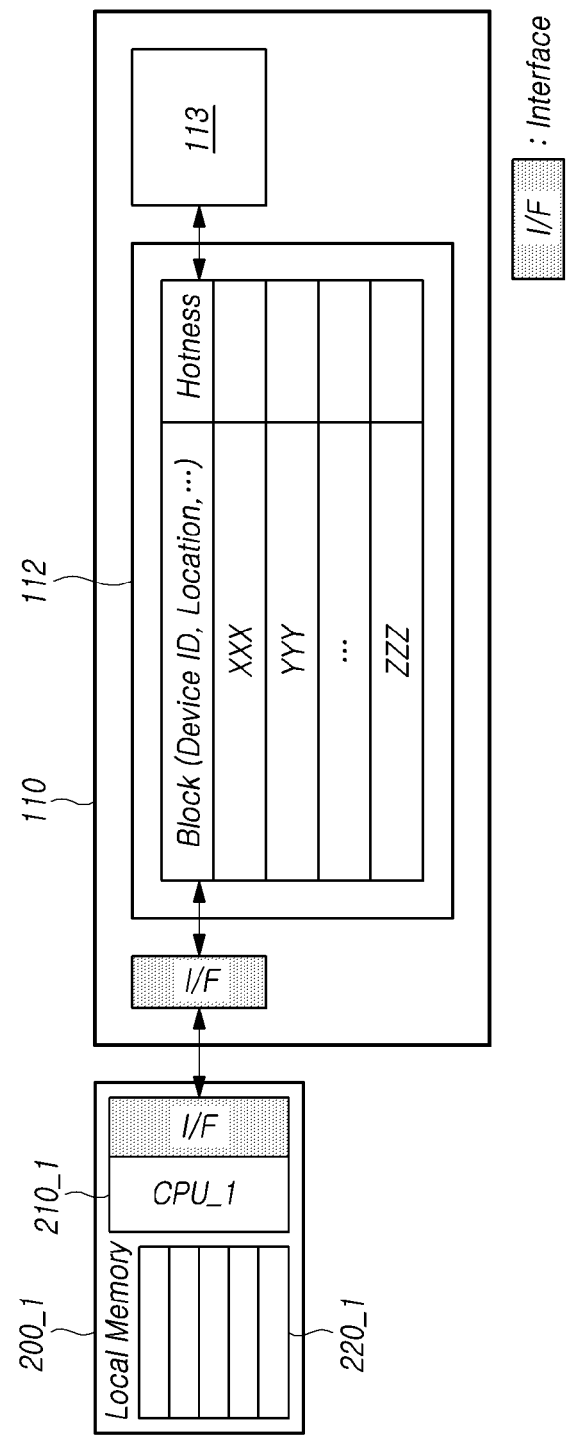
FIG. 10 illustrates an example of a method of determining a prefetch block by a switching controller according to embodiments of the present disclosure.
Figure 11:
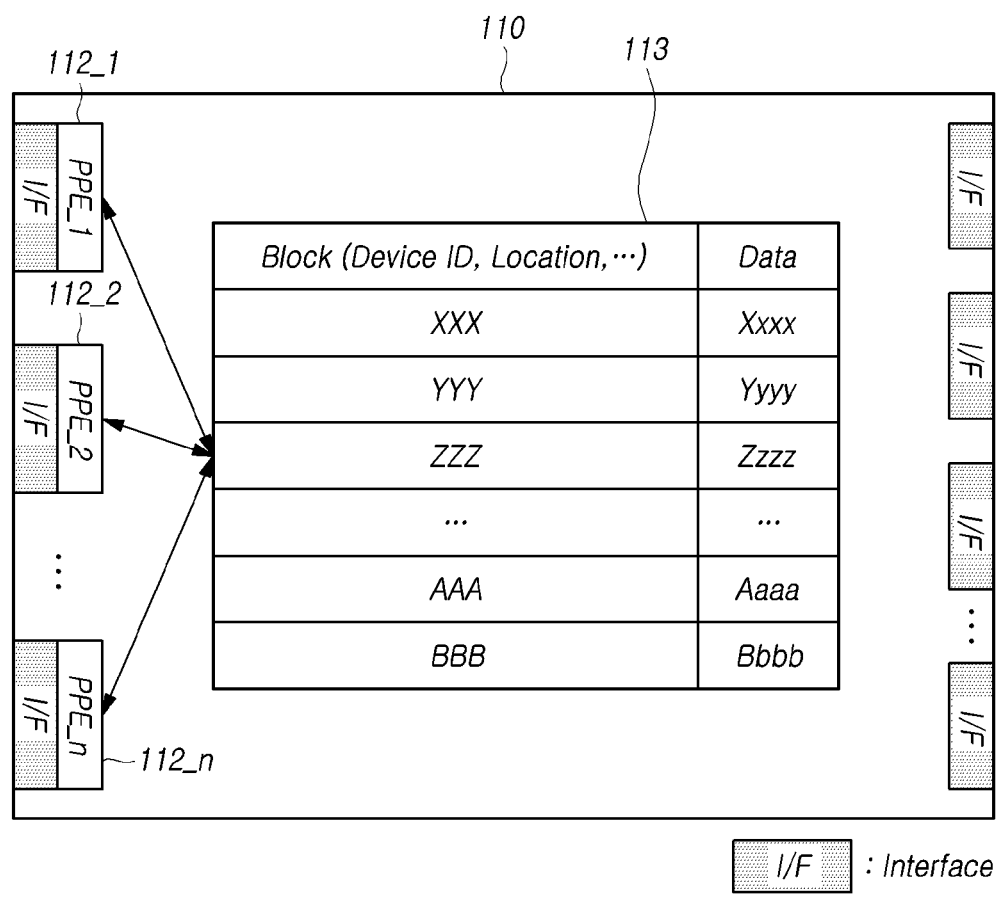
FIG. 11 illustrates an example of data stored in a buffer memory in a switching controller according to embodiments of the present disclosure.

FIG. 10 illustrates an example of a method of determining a prefetch block by a switching controller according to embodiments of the present disclosure. FIG. 11 illustrates an example of data stored in a buffer memory in a switching controller according to embodiments of the present disclosure.

FIG. 10 illustrates an example in which a buffer memory control module 112 controls prefetching.

The buffer memory control module 112 included in the switching controller 110 may manage the access frequency or the read request frequency to a storage block SB of the memory 120 according to a command input by the first external device 200_1 in the form of a table.

The buffer memory control module 112 may include, for example, a counter, and may update the hotness of the storage block SB storing data corresponding to the command, upon receiving a command through the routing module 111 or directly from the first external device 200_1.

The table included in the buffer memory control module 112 may be separately created for each external device 200, or may be created to store and manage the hotness information for all storage blocks SB according to commands input by all external devices 200.

The buffer memory control module 112 may determine a storage block SB to be prefetched into the buffer memory 113 based on the hotness of each storage block SB.

If the storage block SB to be prefetched is determined, then the buffer memory control module 112 may prefetch the storage block SB corresponding to the buffer block PB of the buffer memory 113.

Referring to FIG. 11, the buffer memory 113 may store a location or address of a storage block SB to be prefetched and data stored in the corresponding storage block SB.

As in the above example, the buffer memory 113 may be included in the switching controller 110 to correspond to each external device 200, or may be included in the switching controller 110 to correspond to two or more external devices 200.

When the buffer memory 113 is configured to correspond to two or more external devices 200, the buffer memory 113 may be managed by two or more buffer memory control modules 112.

Each of the two or more buffer memory control modules 112 may include a table for managing the hotness described above with reference to FIG. 10, and may manage data to be prefetched into the buffer memory 113 and data to be deleted, from among the prefetched data, based on the corresponding table.

A management table included in each of the two or more buffer memory control modules 112 may be shared by the two or more buffer memory control modules 112. In addition, the storage block SB of the memory 120 may be prefetched or deleted from the buffer memory 113 based on the overall distribution of the hotness managed by each of the two or more buffer memory control modules 112.

As described above, the buffer memory control module 112 and the buffer memory 113 may be disposed inside the switching controller 110, which transmits the command input by the external device 200 to the memory 120, and may prefetch a part of the storage block SB of the memory 120 into the buffer memory 113, thereby reducing a latency or a delay of a read request by the external device 200.

In addition, the difference between the access speed between the processor 210 and the local memory 220 included in the external device 200, and the access speed between the processor 210 and the memory 120 included in the storage device 100, may be reduced by using the buffer memory 113 in the switching controller 110. Since the processor 210 performs data processing using both the local memory 220 located inside the external device 200 and the memory 120 located outside the external device 200, the difference in access latency is reduced, and it is possible to improve the performance of data processing by the processor 210.

Based on embodiments of the disclosed technology described above, the operational delay time of the memory system may be advantageously reduced or minimized. In addition, based on embodiments of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a plurality of memories; and
a switching controller configured to communicate with each of the plurality of memories and to transmit a command input by a plurality of external devices to at least one of the plurality of memories, each of the plurality of memories including a plurality of storage blocks,
wherein the switching controller comprises,
a buffer memory corresponding to at least one of the plurality of external devices, and
a buffer memory control module configured to select data stored in at least one of the plurality of storage blocks and to store the selected data in the buffer memory, or to delete data stored in the buffer memory, based on the command input for a predetermined period,
wherein the buffer memory located in the switching controller stores data stored in at least one of the plurality of storage blocks included in each of the plurality of memories located outside of the switching controller.

2. The storage device of claim 1, wherein the buffer memory control module selects the data stored in the at least one of the plurality of storage blocks based on at least one of an access frequency for each of the plurality of memories or an access frequency for each of the plurality of storage blocks according to the command input during the predetermined period, and stores the selected data in the buffer memory.

3. The storage device of claim 1, wherein the buffer memory control module selects the data stored in the at least one of the plurality of storage blocks based on a read request frequency for the data stored in the at least one of the plurality of storage blocks during the predetermined period.

4. The storage device of claim 1, wherein the buffer memory control module selects the data stored in the at least one of the plurality of storage blocks adjacent to a storage block whose data is stored in the buffer memory based on at least one of an access frequency and a read request frequency during the predetermined period, and stores the selected data in the buffer memory.

5. The storage device of claim 1, wherein the at least one of the plurality of memories comprises a storage block including a first area accessed by a first external device and a second area accessed by a second external device.

6. The storage device of claim 5, wherein the buffer memory control module determines, based on the sum of at least one of an access frequency or a read request frequency for the first area and at least one of an access frequency or a read request frequency for the second area, whether to store data of the storage block, including data of the first area and the second area, in the buffer memory.

7. The storage device of claim 5, wherein the buffer memory control module determines, based on whether an access frequency or a read request frequency for the first area is equal to or greater than a preset reference value, or whether an access frequency or a read request frequency for the second area is equal to or greater than the preset reference value, whether to store data of the storage block, including data of the first area and the second area, in the buffer memory.

8. The storage device of claim 7, wherein when the access frequency or the read request frequency for the first area is equal to or greater than the preset reference value, the buffer memory control module stores data of the storage block, including the data of the first area and the second area, in the buffer memory.

9. The storage device of claim 8, wherein, when a read request for the data stored in the second area is issued by an external device, the data of the second area stored in the buffer memory is provided to the external device.

10. The storage device of claim 1, wherein the switching controller further comprises a routing module for transmitting the command input by the plurality of external devices to at least one of the plurality of memories or the buffer memory.

11. The storage device of claim 10, wherein the routing module transmits the command input by one of the plurality of external devices to the buffer memory, and
wherein, if data corresponding to the command input is stored in the buffer memory, the data corresponding to the command input and stored in the buffer memory is transmitted to the one of the plurality of external devices through the routing module.

12. The storage device of claim 11, wherein, when the data stored in the buffer memory and corresponding to the command input is transmitted to the one of the plurality of external devices through the routing module, the buffer memory control module updates at least one of an access frequency or a read request frequency for the at least one of the plurality of storage blocks including the same data stored in the buffer memory stored in the at least one of the plurality of storage blocks.

13. The storage device of claim 11, wherein, when data corresponding to the command input by one of the plurality of external devices is not stored in the buffer memory, the routing module transmits the command input to at least one of the plurality of memories, and
wherein data stored in the at least one of the plurality of memories is transmitted to the one of the plurality of external devices through the routing module.

14. The storage device of claim 1, wherein each of the plurality of external devices comprises at least one local memory.

15. The storage device of claim 1, wherein the switching controller communicates with each of the plurality of external devices through the same interface as an interface communicating with each of the plurality of memories.

16. A switching controller comprising:
at least one buffer memory;
a buffer memory control module configured to select data stored in at least one of a plurality of storage blocks included in each of a plurality of memories and to store the selected data into the at least one buffer memory, or delete data stored in the at least one buffer memory, based on a command for a predetermined period by a plurality of external devices; and
a routing module configured to transmit the command by the plurality of external devices to the plurality of memories or the at least one buffer memory,
wherein the at least one buffer memory located in the switching controller stores data stored in at least one of the plurality of storage blocks included in each of the plurality of memories located outside of the switching controller.

17. The switching controller of claim 16, wherein, when the command is input by the plurality of external devices, the routing module transmits the command to the at least one buffer memory, and
wherein, when data corresponding to the command is stored in the at least one buffer memory, the data corresponding to the command and stored in the at least one buffer memory is transmitted to at least one of the plurality of external devices through the routing module.

18. The switching controller of claim 17, wherein, if data corresponding to the command is not stored in the at least one buffer memory, the routing module transmits the command to at least one of the plurality of memories, and data stored in the at least one of the plurality of memories and corresponding to the command is transmitted to at least one of the plurality of external devices through the routing module.

19. A computing system comprising:
a plurality of external devices; and
a storage device including a buffer memory and comprising a plurality of memories and a switching controller for communicating with the plurality of memories and transmitting a command input by the plurality of external devices to at least one of the plurality of memories;
wherein entire data of a storage block included in at least one of the plurality of memories is stored in the buffer memory based on a command input to the storage device by a first external device of the plurality of external devices, and a part of the entire data stored in the buffer memory is transmitted to a second external device through the switching controller according to a command input to the storage device by the second external device, and
wherein the buffer memory located in the switching controller stores data stored in at least one of a plurality of storage blocks included in each of the plurality of memories located outside of the switching controller.

20. The computing system of claim 19, wherein, if the part of the entire data is transmitted to the second external device through the switching controller, at least one of an access frequency or a read request frequency for the entire data stored in the buffer memory is updated.

* * * * *